( 12 ) United States Patent
Aposhian et al.

(10) Patent No.: US 9,872,421 B2
(45) Date of Patent: Jan. 23, 2018

(54) SOD HARVESTER HAVING INCLINED STACKING CONVEYOR

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US); Daniel A. Aposhian, West Valley City, UT (US); Matthew G. Aposhian, Kaysville, UT (US)

(73) Assignee: FireFly Automatix, Inc., North Salt Lake, UT (US)

( * ) Notice: Subject to any disclaimer, the term of this patent is extended or adjusted under 35 U.S.C. 154(b) by 286 days.

(21) Appl. No.: 14/815,503

(22) Filed: Jul. 31, 2015

(65) Prior Publication Data
US 2017/0027098 A1 Feb. 2, 2017

(51) Int. Cl.
*A01B 45/04* (2006.01)
(52) U.S. Cl.
CPC .................................. *A01B 45/045* (2013.01)
(58) Field of Classification Search
CPC ...... A01B 45/04; A01B 45/045; B65G 47/086
See application file for complete search history.

(56) References Cited

U.S. PATENT DOCUMENTS

| 3,580,375 A * | 5/1971 | Nunes, Jr. ............... | A01B 45/04 172/19 |
| 4,294,316 A * | 10/1981 | Hedley ................ | A01B 45/045 172/20 |
| 4,537,208 A * | 8/1985 | Kuhl ...................... | B65G 60/00 134/124 |
| 2006/0102363 A1* | 5/2006 | Tvetene ............... | A01B 45/045 172/20 |
| 2006/0185860 A1* | 8/2006 | Brouwer ................ | A01G 1/002 172/19 |
| 2013/0259629 A1* | 10/2013 | Aposhian ............. | A01B 45/045 414/788.1 |
| 2013/0259630 A1* | 10/2013 | Aposhian ............... | G05B 19/23 414/792 |

* cited by examiner

*Primary Examiner* — Robert E Pezzuto
*Assistant Examiner* — Jessica H Lutz
(74) *Attorney, Agent, or Firm* — Kirton McConkie; Brian Tucker

(57) ABSTRACT

A sod harvester can include an inclined stacking conveyor from which slabs of sod are removed for stacking on a pallet. The direction of incline of the stacking conveyor can be opposite that of one or more inclined conveyors used to convey sod from a cutting head to the stacking conveyor. Therefore, slabs of sod can ascend along the one or more inclined conveyors and then descend along the inclined stacking conveyor from which they are removed by the stacking head. The stacking head can also be inclined to correspond with the incline of the stacking conveyor. By inclining the stacking conveyor and the stacking head, the stacking head does not need to move vertically when removing slabs of sod from the stacking conveyor.

20 Claims, 10 Drawing Sheets

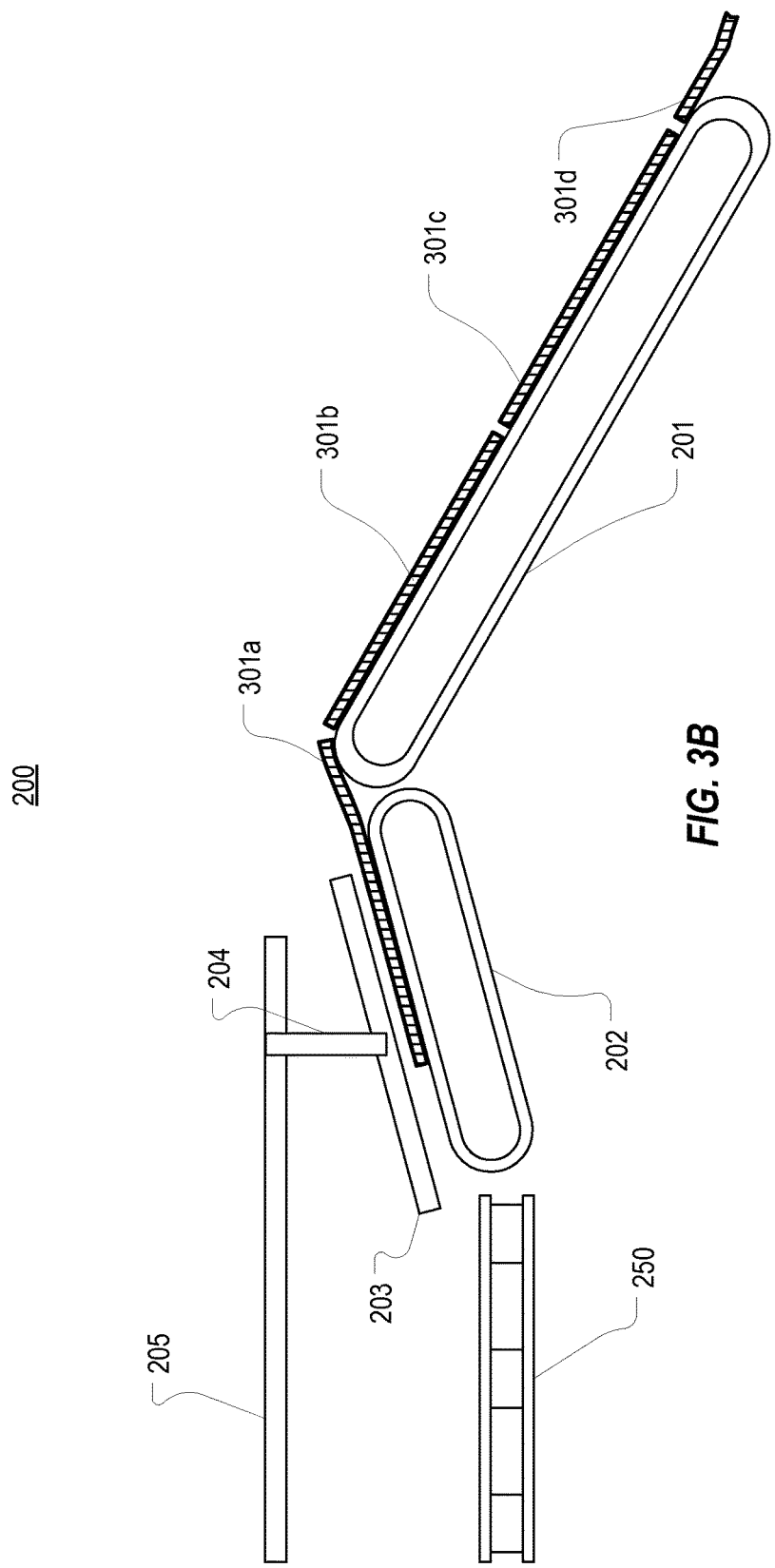

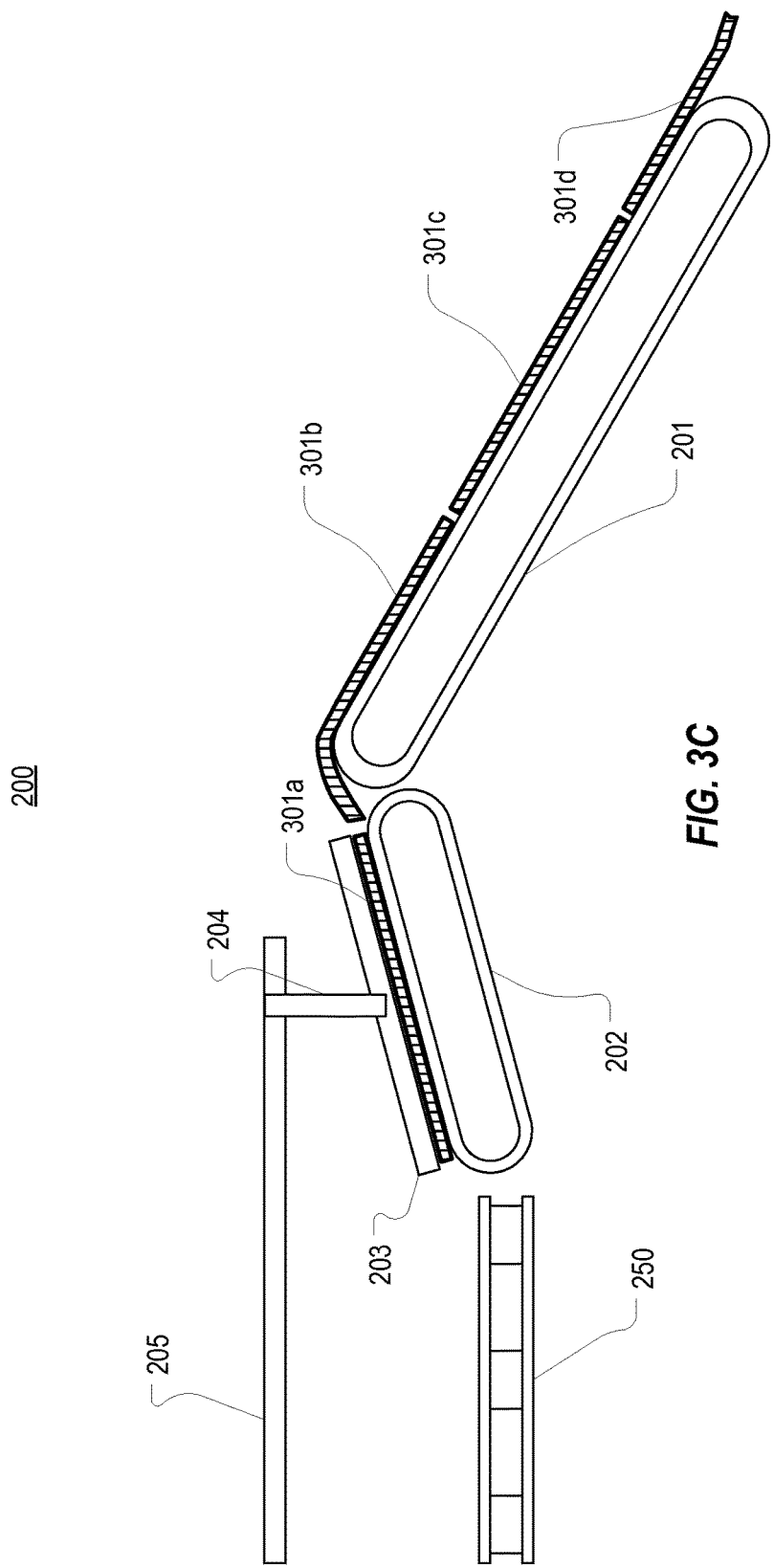

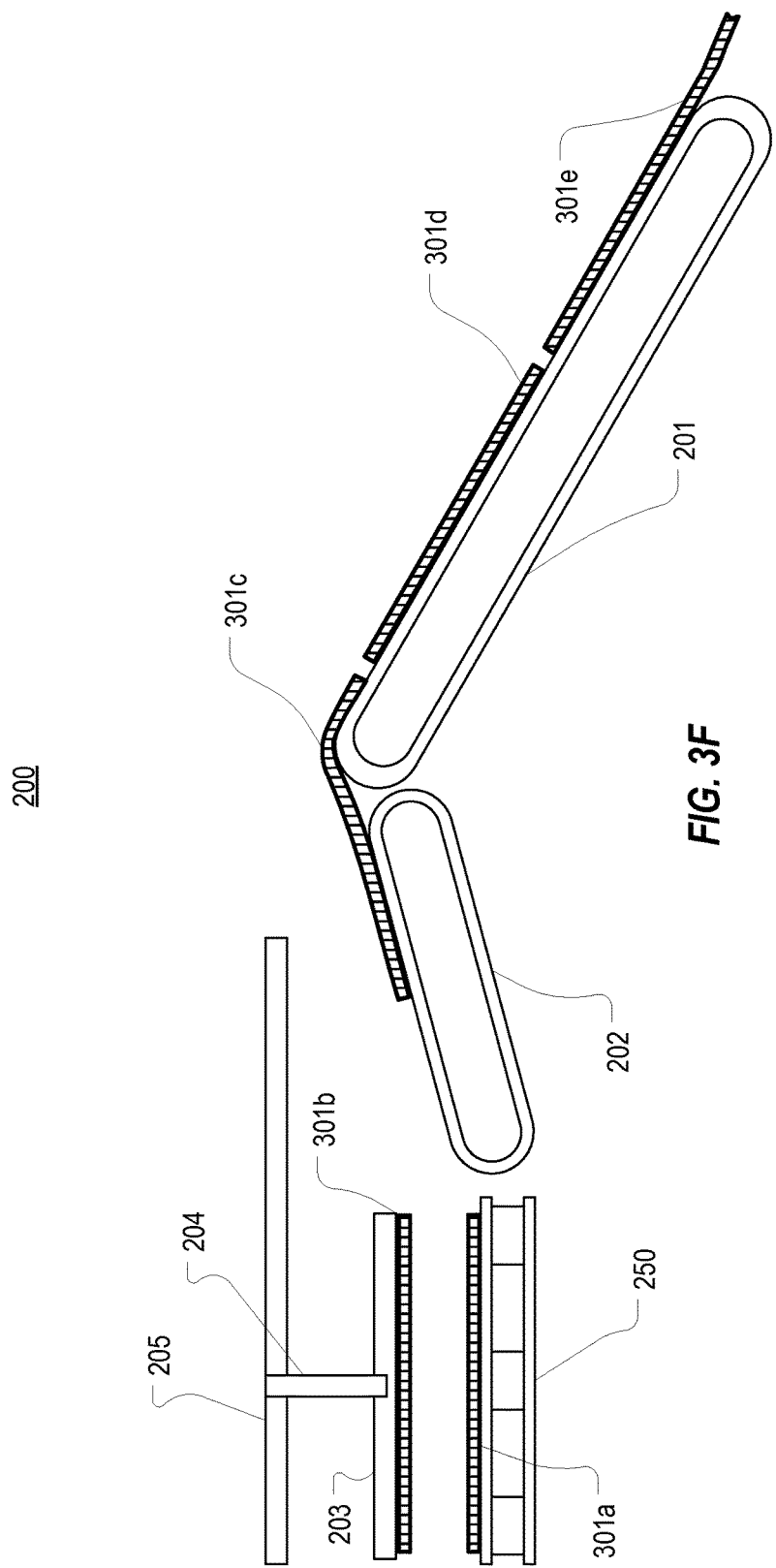

SOD HARVESTER HAVING INCLINED STACKING CONVEYOR

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery that cuts slabs of sod from the soil and stacks them on pallets.

FIG. 1 illustrates a portion of a sod harvesting machine 100 that includes a typical cutting head, conveyor system, and stacking system. The cutting head of FIG. 1 includes a chop mechanism 110, an oscillating blade 103, and a roller 104. Chop mechanism 110 is configured to periodically descend into the sod 151 to make vertical cuts defining an initial width/length of the slabs. Oscillating blade 103 oscillates back and forth underneath the sod to sever the slab from the underlying soil 150. Roller 103 applies pressure to the sod as it is cut to facilitate the cutting of clean slabs. Slabs cut by the cutting head are routed to conveyor 101 which lifts the slabs up to stacking conveyor 102 from which they are removed by a stacking head 105 for stacking on a pallet. Typically, the pallet is positioned adjacent to the stacking conveyor so that the stacking head can move back and forth between the stacking conveyor and pallet when stacking.

It is generally desirable to harvest sod as quickly as possible. However, various factors limit the speed at which sod can be harvested primary of which is the rate at which sod can be stacked on a pallet. For example, the ground speed of the sod harvester directly defines the rate at which sod is harvested. However, even if a sod harvester is capable of cutting sod from the ground at a faster rate, the sod harvester may still be limited by the rate at which the sod can be removed from the stacking conveyor and stacked on the pallet. In other words, the ground speed of sod harvester 100 is limited by the rate at which the stacking head 105 can remove sod from stacking conveyor 102.

Even if a stacking head can be operated quickly to increase the rate of sod harvesting, the increased rate does not necessarily yield a net gain in efficiency. For example, operating the stacking head at high rates can require substantial additional amounts of energy leading to increased fuel costs. These increased fuel costs may offset any gains resulting from the increased rate of sod harvesting. Also, operating at high rates increases the forces on the components of the stacking head leading to more frequent and costly repairs and corresponding downtime. Accordingly, the stacking head oftentimes forms the bottleneck during the sod harvesting process.

BRIEF SUMMARY

The present invention extends to a sod harvester that includes an inclined stacking conveyor from which slabs of sod are removed for stacking on a pallet. By employing an inclined stacking conveyor, a stacking head can remove slabs of sod from the stacking conveyor without requiring vertical movement of the stacking head. In this way, the stacking operation can be completed more quickly which in turn allows the sod harvester to be operated at a faster ground speed.

An inclined stacking conveyor can be positioned inline with one or more inclined conveyors which carry sod from the ground to the stacking conveyor. The direction of incline of the stacking conveyor can be opposite that of the one or more inclined conveyors. Therefore, slabs of sod can ascend along the one or more inclined conveyors and then descend along the inclined stacking conveyor from which they are removed by the stacking head.

In some embodiments, to account for the orientation of the inclined stacking conveyor, the stacking head can be configured to pivot between an inclined position and a horizontal position. When in the inclined position, the stacking head can be shuttled to a pick-up position overtop the stacking conveyor. Then, after picking up a slab, the stacking head can be pivoted into the horizontal position as it is shuttled to a stacking position overtop a pallet. While in the horizontal position, the stacking head can release the slab onto the pallet. In other embodiments, however, the stacking head can be maintained in the inclined position throughout the stacking process. In either case, the sod harvester can be configured with repositionable pallet supports so that the pallet can be lowered as layers of sod are placed thereon. In this way, there is no need for the stacking head to move vertically when placing a slab on the pallet.

A sod harvester configured with an inclined stacking conveyor can include a blade for forming individual slabs prior to the slabs being removed from the soil. In such cases, a series of slabs would be advanced upwardly along the one or more inclined conveyors. Alternatively, the sod harvester could include a blade positioned overtop the one or more inclined conveyors (or over the stacking conveyor) for forming individual slabs on the one or more inclined conveyors. In such cases, a continuous length of sod would be advanced onto and along the one or more inclined conveyors until reaching the blade.

In some embodiments, the sod harvester can be configured so that the pallet is positioned inline with the one or more inclined conveyors and the inclined stacking conveyor. In such cases, the stacking head can be configured to shuttle along a single axis parallel to the direction in which the sod harvester travels. In other embodiments, the sod harvester can be configured so that the pallet is positioned alongside the inclined stacking conveyor. In such cases, the stacking head can be configured to shuttle along an axis parallel to as well as an axis orthogonal to the direction in which the sod harvester travels. In either case, however, the stacking head does not need to travel along a vertical axis (other than vertical movement during pivoting) due to the inclined orientation of the stacking conveyor.

In one embodiment, the present invention is implemented as a sod harvester comprising a cutting head for cutting sod from the ground, one or more inclined conveyors for receiving the sod from the cutting head and elevating the sod towards a stacking head, a stacking conveyor configured to receive the sod from the one or more inclined conveyors, the stacking conveyor being oriented with an incline opposite the one or more inclined conveyors such that the sod descends along the stacking conveyor, and the stacking head that is configured to remove the sod from the stacking conveyor. The stacking head has an inclined orientation that corresponds with the incline of the stacking conveyor. The stacking head is in the inclined orientation while removing the sod from the stacking conveyor. The stacking head is further configured to stack the sod on a pallet.

In another embodiment, the present invention is implemented as a sod harvester comprising a cutting head for cutting sod from the ground, one or more inclined conveyors configured to receive the sod from the cutting head, a stacking conveyor configured to receive the sod from the one or more inclined conveyors, the stacking conveyor being inclined in a downward direction, and a stacking head configured to remove the sod from the stacking conveyor. The stacking head is oriented with an incline that corresponds with the incline of the stacking conveyor when removing the sod from the stacking conveyor.

In another embodiment, the present invention is implemented as a sod harvester comprising a cutting head for cutting sod from the ground, one or more first conveyors for receiving the sod from the cutting head, the one or more first conveyors being oriented with a first incline, a stacking conveyor for receiving the sod from the one or more first conveyors, the stacking conveyor being oriented with a second incline, the second incline being opposite the first incline, and a stacking head that shuttles between a pick-up position overtop the stacking conveyor and a stacking position overtop a pallet, the stacking head being inclined to correspond with the second incline while in the pick-up position.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A-3F provide a series of illustrations of the sod harvester of FIG. 2 while performing a stacking operation;

DETAILED DESCRIPTION

Figure 1:
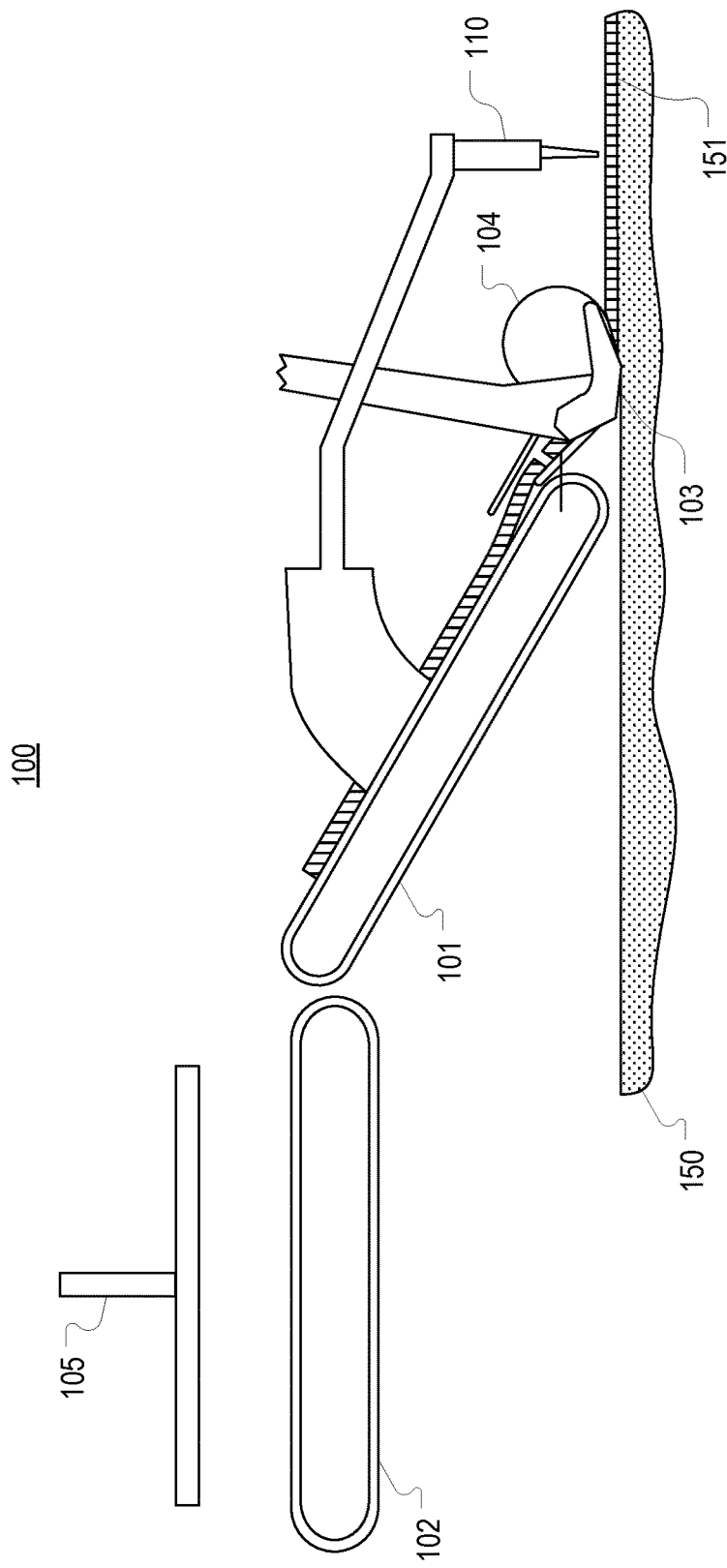
FIG. 1 illustrates an example of various components of a typical sod harvesting machine.
Figure 2:
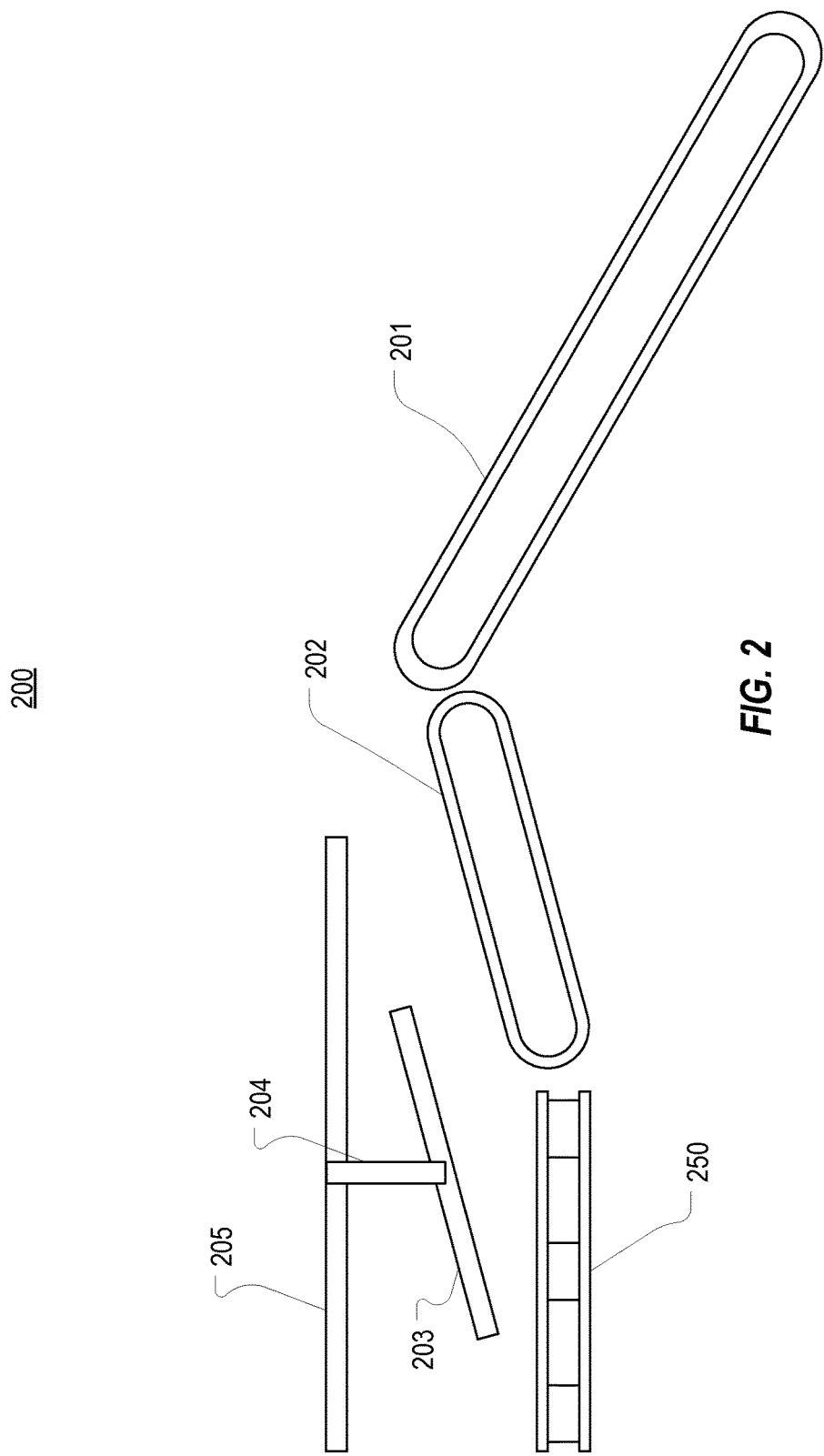
FIG. 2 illustrates an example of a sod harvester that includes an inclined stacking conveyor.

FIG. 2 illustrates components of a sod harvester 200 that is configured in accordance with embodiments of the present invention. As oriented in FIG. 2, a front end of sod harvester 200 would be at the right while a back end of sod harvester 200 would be at the left. Although not shown, sod harvester 200 would include a cutting head at or near the front end of sod harvester 200 for removing sod from the ground and delivering the sod to an inclined conveyor 201. Inclined conveyor 201 advances the sod upwardly to inclined stacking conveyor 202 as sod harvester 200 travels over the ground (which in this example would be in a left to right direction).

Although a single inclined conveyor 201 is shown, the present invention extends to embodiments where more than one inclined conveyor 201 is employed. For example, two inline inclined conveyors 201 could be used. Regardless of the number of inclined conveyors 201, each inclined conveyor 201 could be operated at a speed that is equal to or slightly greater than ground speed. Also, in cases where more than one inclined conveyor 201 is employed, the inclined conveyors could be operated at different speeds (e.g., one at ground speed and another at slightly faster than ground speed).

Sod harvester 200 can be configured to form individual slabs of sod while the sod is still in the soil (e.g., by employing a blade in the cutting head that periodically descends into the ground) or while the sod is positioned on inclined conveyor 201 or on inclined stacking conveyor 202. FIGS. 3A-3F represent embodiments where individual slabs are formed prior to advancing the slabs onto inclined conveyor 201. In contrast, FIG. 4 provides an example of an embodiment where a continuous length of sod is fed onto inclined conveyor 201 and then cut by a blade 206 positioned overtop inclined conveyor 201.

Regardless of how individual slabs of sod are formed, the slabs of sod can be advanced from inclined conveyor 201 onto inclined stacking conveyor 202. As shown in FIG. 2, stacking conveyor 202 is inclined towards the back end of sod harvester 200. Therefore, slabs of sod descend as they travel along stacking conveyor 202. By inclining stacking conveyor 202 in this manner, stacking head 203 does not have to move in a vertical direction to remove the slabs from stacking conveyor 202. Therefore, a stacking operation can be performed without vertical movement of stacking head 203 thereby increasing the rate at which slabs can be stacked.

Eliminating the need for vertical movement of stacking head 203 also reduces the complexity and, more importantly, the weight of stacking head 203. To move stacking head 203 in a vertical manner, a motor or other similar mechanism would typically be included within the structure of stacking head 203. The added weight of such a motor increases the amount of energy that would be required to move stacking head 203. Therefore, by eliminating the need for vertical movement, a motor to perform such vertical movement can also be eliminated. This reduction in the weight of stacking head 203 reduces the amount of energy, and therefore the amount of fuel, required to perform a stacking operation.

As shown in FIG. 2, stacking head 203 can be coupled to a frame 205 via a support 204. Support 204 can be configured to shuttle along frame 205 to move stacking head 203 from a pick-up position overtop stacking head 202 to a stacking position overtop pallet 250. Frame 205 and support 204 can be any suitable structure for enabling stacking head 203 to be shuttled between the pick-up position and the stacking position.

In some embodiments, such as shown in FIG. 2, pallet 250 can be positioned inline with stacking conveyor 202. In such cases, stacking head 203 only needs to be configured to shuttle along a single axis that is parallel with the direction in which sod harvester 200 travels. Because stacking conveyor 202 is inclined, the backward movement (or leftward movement) of stacking head 203 from the pick-up position quickly clears stacking conveyor 202 to allow a subsequent slab to be advanced.

In other embodiments, pallet 250 can be positioned alongside stacking conveyor 202. In such cases, stacking head 203 can be configured to travel along two axes to ensure that stacking conveyor 202 is quickly cleared. In particular, if stacking head 203 were to employ movement in a single axis orthogonal to the axis of stacking conveyor 202 (e.g., an axis extending into and out from FIG. 2), a slab picked up by stacking head 203 would not be clear of stacking conveyor 202 until stacking head 203 had traveled a distance equal to the width of the slab. For this reason, even in embodiments where pallet 250 may be positioned alongside stacking conveyor 202, stacking head 203 may travel backwards while removing a slab from stacking conveyor 202.

Figure 5:
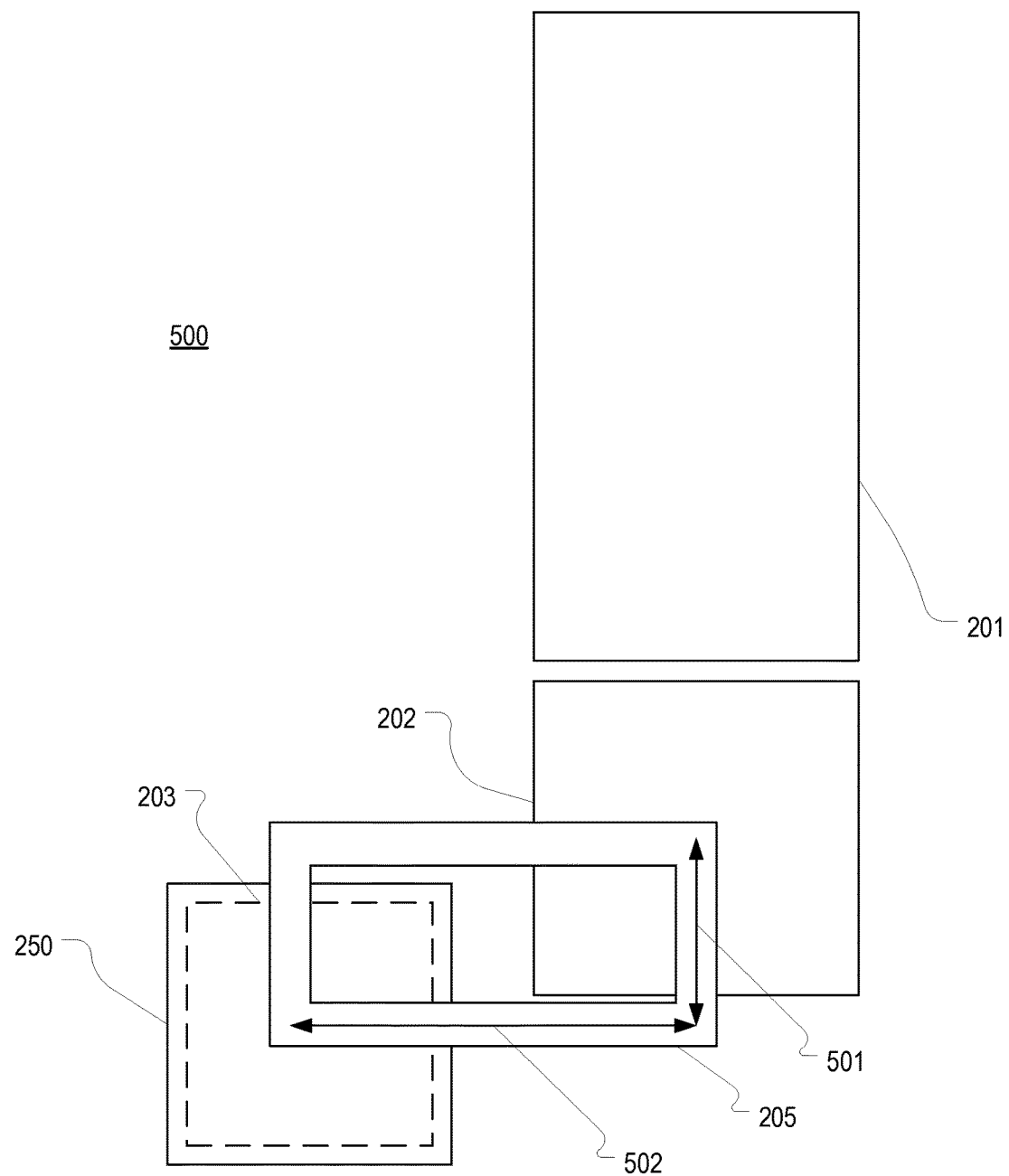
FIG. 5 illustrates an embodiment of a sod harvester having an inclined stacking conveyor and a pallet that is not inline with the stacking conveyor.

FIG. 5 provides an example of how stacking head 203 can be configured to travel in two axes in embodiments where pallet 250 is not positioned inline with stacking conveyor 202. In FIG. 5, a top view of a sod harvester 500 is shown. In such cases, inclined conveyor 201 and stacking conveyor 202 can be oriented in the same manner as shown in FIG. 2. In FIG. 5, frame 205 is configured to allow stacking head 203 to move along both a longitudinal (as represented by arrow 501) axis and a transverse axis (as represented by arrow 502). Such movement could be accomplished by employing a first motor to move stacking head 203 along the longitudinal axis and a second motor to move stacking head 203 along the transverse axis. In some embodiments, movement can occur simultaneously along both axes (e.g., by driving both motors simultaneously) causing stacking head 203 to move in a generally diagonal direction during at least a portion of its travel from the pick-up to the stacking position.

Stacking head 203 and support 204 can be configured so that stacking head 203 is oriented with an incline that corresponds to the incline of stacking conveyor 202. Accordingly, stacking head 203 can be aligned with stacking conveyor 202 to facilitate the removal of slabs from stacking conveyor 202.

In some embodiments, stacking head 203 can be coupled to support 204 in a manner that allows stacking head 203 to pivot between the inclined orientation and a horizontal orientation. In such cases, stacking head 203 can pivot to the inclined orientation when picking up a slab from stacking conveyor 202 and can pivot to the horizontal position when dropping a slab onto pallet 250. However, in some embodiments, stacking head 203 can remain in the inclined orientation even when dropping a slab on pallet 250. Any suitable structure to facilitate pivoting could be employed.

FIGS. 3A-3F provide a series of illustrations depicting how sod harvester 200 can perform a stacking operation. As stated above, these figures represent embodiments where individual slabs of sod are cut while the slabs are still in the soil such that the individual slabs are fed onto inclined conveyor 201. However, a similar process would be employed when a continuous length of sod is advanced onto inclined conveyor 201. Also, although this stacking operation process will be described using an example where pallet 250 is inline with stacking conveyor 202, the same process can be employed when pallet 250 is not positioned inline with stacking conveyor 202.

Figure 3A:
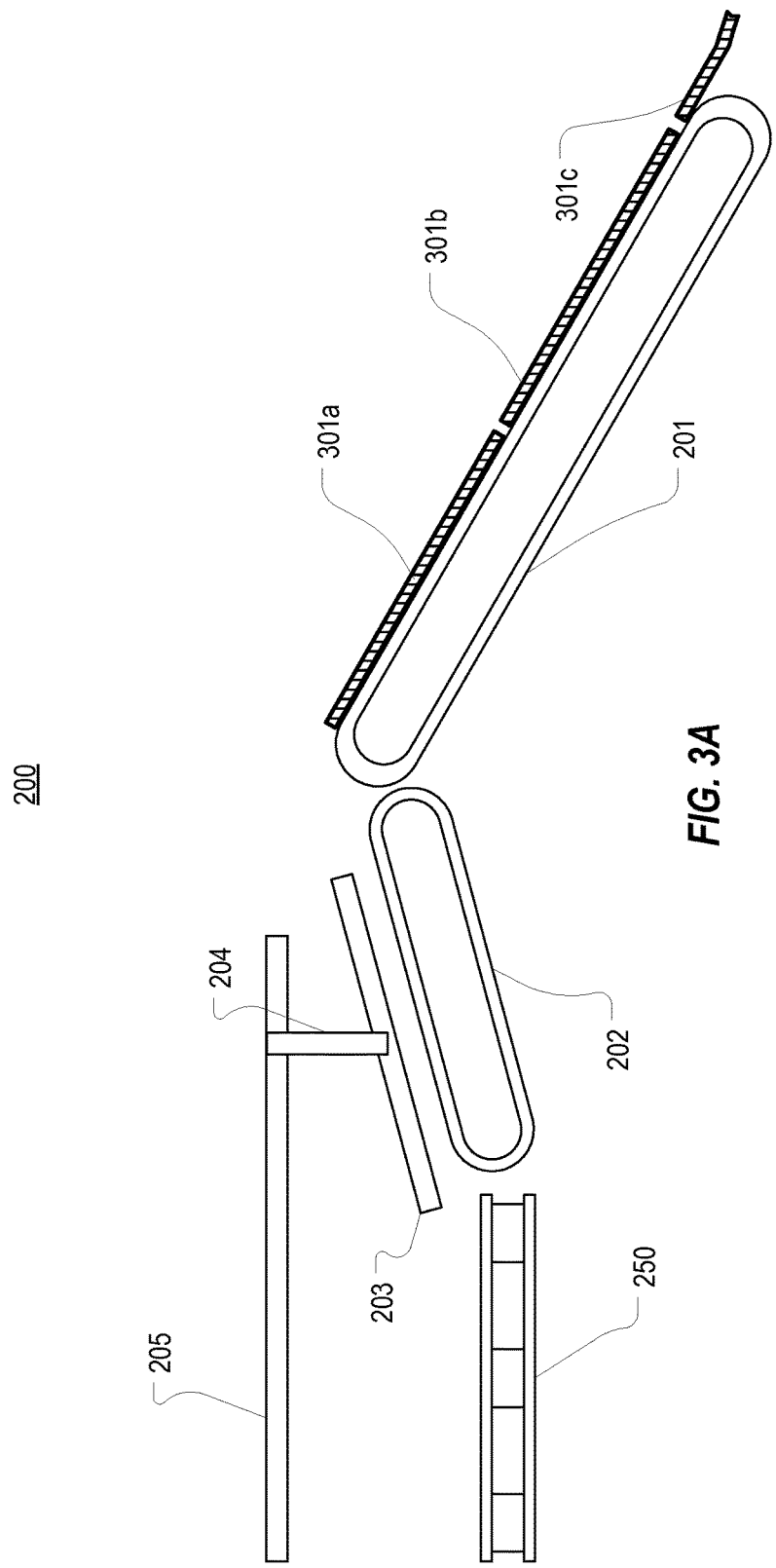
Figure 4:
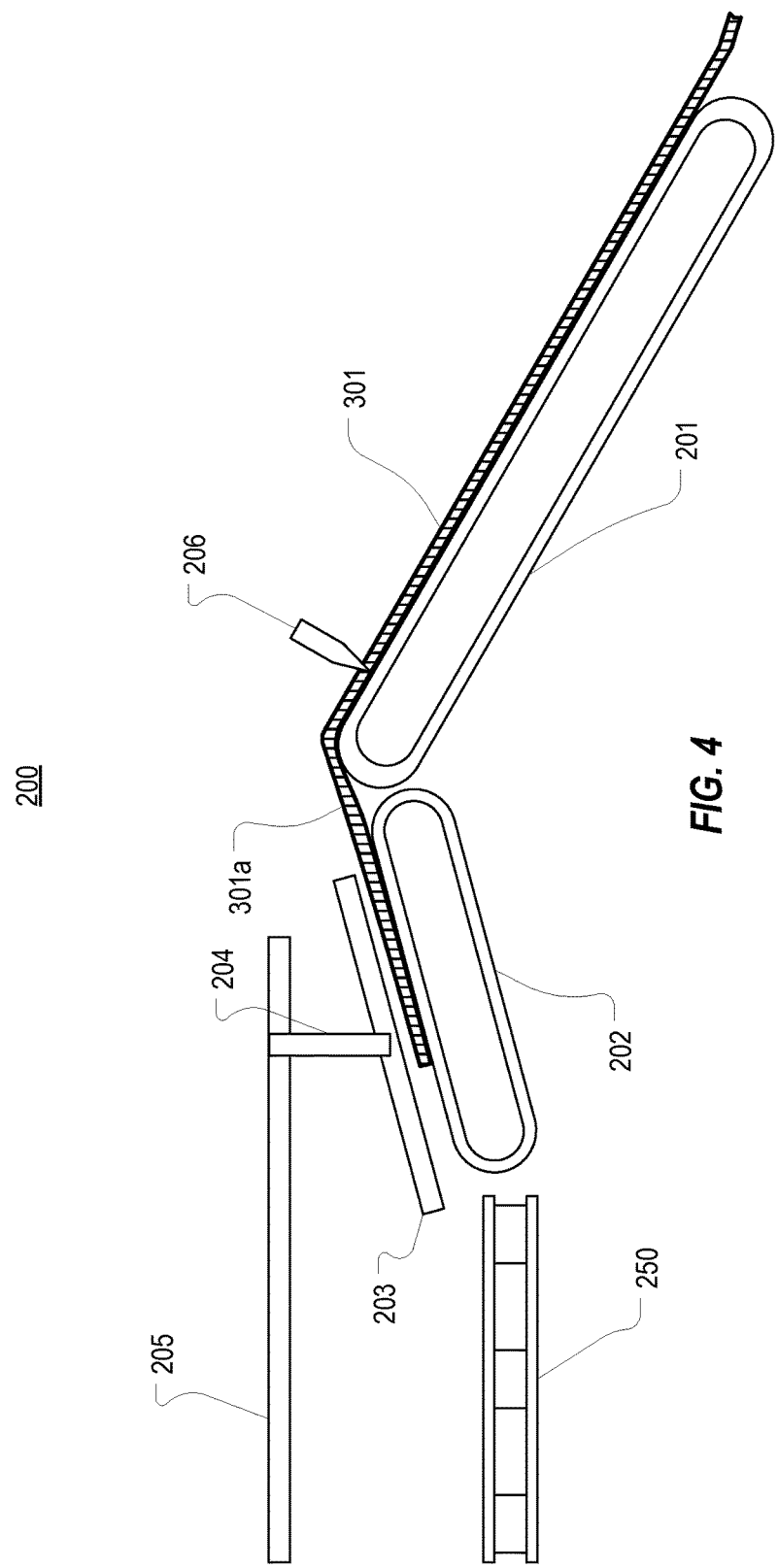
FIG. 4 illustrates an embodiment of the sod harvester of FIG. 2 in which individual slabs of sod are formed after the sod has been advanced onto the one or more inclined conveyors.

FIG. 3A represents a state of sod harvester 200 as slabs of sod are beginning to be fed upwardly along inclined conveyor 201. As shown, a first slab 301a, a second slab 301b, and a third slab 301c are being advanced along inclined conveyor 201. In this example, inclined conveyor 201 is rotated at a speed that is slightly faster than ground speed such that a small gap is formed between adjacent slabs. In this state, stacking head 203 is in an idle state as it awaits the next slab for stacking. In this idle state, stacking head 203 could be positioned overtop stacking conveyor 202 as shown or could be positioned in another location such as overtop pallet 250. In any case, stacking head 203 can be spaced sufficiently away from the top surface of stacking conveyor 202 so as to not interfere with the advancement of a slab onto stacking conveyor 202.

FIG. 3B illustrates that the continued advancement of inclined conveyor 201 as well as the advancement of stacking conveyor 202 have caused slab 301a to be advanced onto stacking conveyor 202. Stacking conveyor 202 could be operated at the same speed as inclined conveyor 301 or at a faster speed if desired. As shown, stacking head 203 is oriented in the inclined position and is spaced slightly from stacking conveyor 202 to allow slab 301a to pass underneath.

FIG. 3C illustrates that slab 301 has been advanced to a pick-up position on stacking conveyor 202. As slab 301a reaches this pick-up position, stacking head 203 can perform a pick-up operation to secure and remove slab 301a from stacking conveyor 202. This pick-up operation can involve securing slab 301a in any suitable manner. For example, stacking head 203 could include pivoting hooks that insert through slab 301a or clamps that grasp the blades of grass. In some embodiments, this pick-up operation may also involve moving stacking head 203 towards stacking conveyor 202 (e.g., slightly to the right as shown in FIG. 3C). This movement towards stacking conveyor 202 can position the bottom surface of stacking head 203 in close proximity to or in contact with the top surface of slab 301 to facilitate securing the slab.

In some embodiments, stacking conveyor 202 can be operated at a constant rate. However, in other embodiments, the rate at which stacking conveyor 202 is operated can be varied based on the position of a slab on the stacking conveyor. For example, when a slab reaches stacking conveyor 202, the speed of the stacking conveyor can be temporarily increased to cause the slab to reach the pick-up position more quickly. The result of this temporary increase in speed is that a greater gap will be formed between adjacent slabs of sod. It is noted that the greater the length of stacking conveyor 202, the larger the increase in the gap that can be created by speeding up stacking conveyor 202.

Increasing the gap can allow stacking conveyor 202 to be temporarily slowed or even stopped during the pick-up operation. For example, with reference to FIGS. 3B and 3C, as slab 301a reaches the position shown in FIG. 3B (or a position similar to what is shown), the speed of rotation of stacking conveyor 202 could be temporarily increased to cause slab 301a to more quickly advance to the pick-up position shown in FIG. 3C. This temporary increase in the speed of rotation would create a larger gap between slab 301a and slab 301b than what is shown in FIG. 3C. As a result, stacking conveyor 202 could be slowed or even stopped momentarily while slab 301a is removed from stacking conveyor 202 since slab 301b would not reach stacking conveyor 202 until a relatively later time.

Figure 3D:
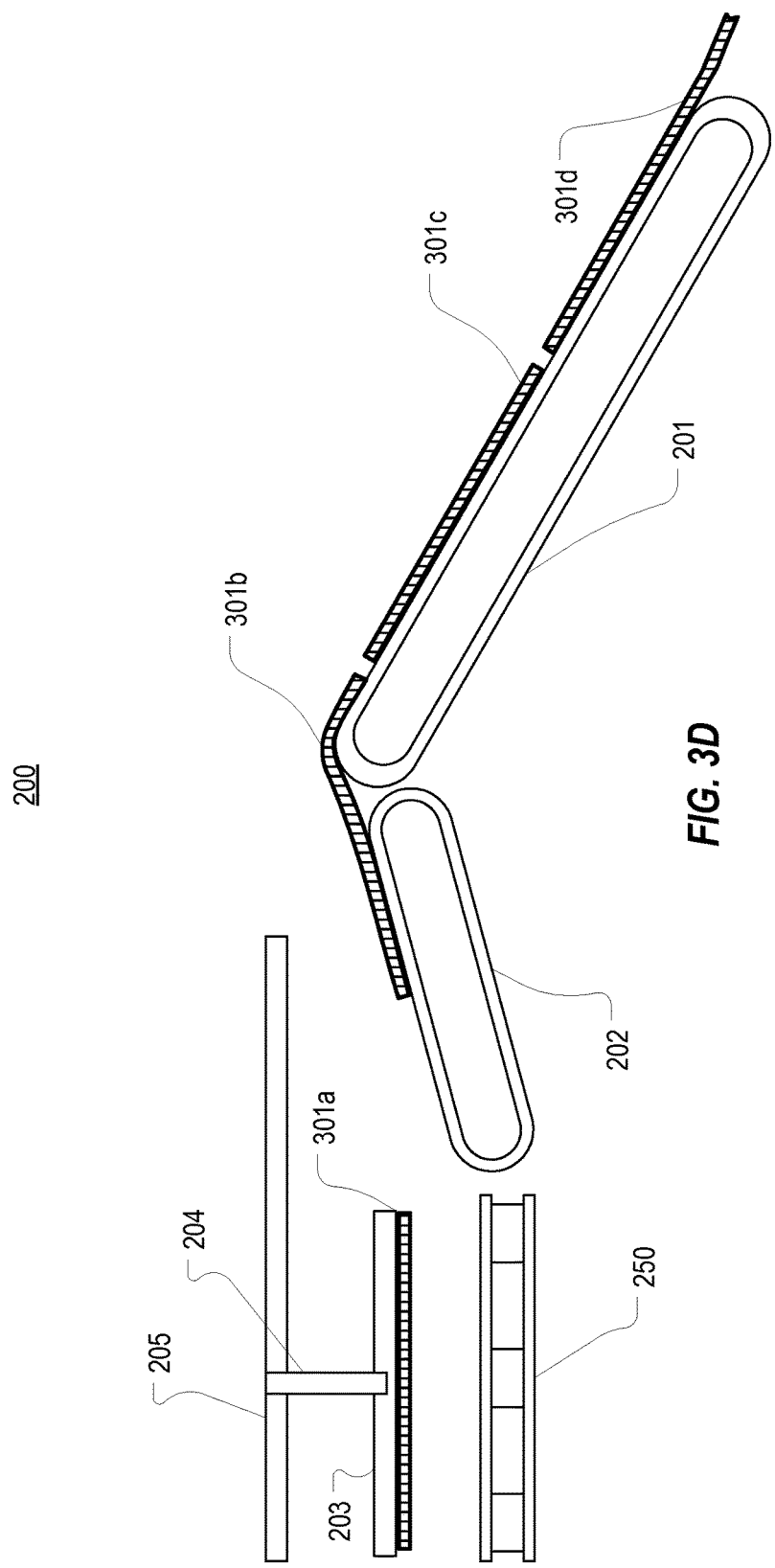

Once stacking head 203 has secured slab 301a, stacking head 203 can be quickly shuttled away from stacking conveyor 202 (e.g., to the left as shown in FIG. 3D) so that stacking head 203 is positioned overtop pallet 250. In some embodiments, such as shown in FIG. 3D, stacking head 203 can pivot to the horizontal orientation (or to some orientation that is less inclined than the inclined orientation used when picking up slab 301a) so that slab 301a is also in the horizontal orientation prior to being released. Alternatively, stacking head 203 could remain in the inclined position. However, releasing a slab from an inclined orientation may not be preferable in many cases since it may increase the likelihood that the slab may end up folded or otherwise improperly oriented once on pallet 250. In any case, once stacking head 203 has been shuttled overtop pallet 250 (i.e., once in the stacking position), stacking head 203 can release slab 301a so that it falls (or is placed) on pallet 250.

It is noted that the figures depict a case where pallet 250 is positioned below stacking head 203 such that a slab would be dropped once released. However, in some embodiments, the angle of incline of stacking conveyor 202 and/or the pivoting of stacking head 203 could be configured so that pallet 250 can be positioned at a height that is substantially the same as the height of stacking head 203 when in a horizontal orientation. In this way, a slab would be dropped a minimal distance to improve the accuracy with which slabs are stacked. Such configurations can be made to facilitate proper stacking while still not requiring that stacking head 203 move in a vertical direction. A pallet support structure (not shown) could be configured to descend as slabs are stacked on pallet 250 so that additional slabs could be stacked without modifying the movement of stacking head 203.

Figure 3E:
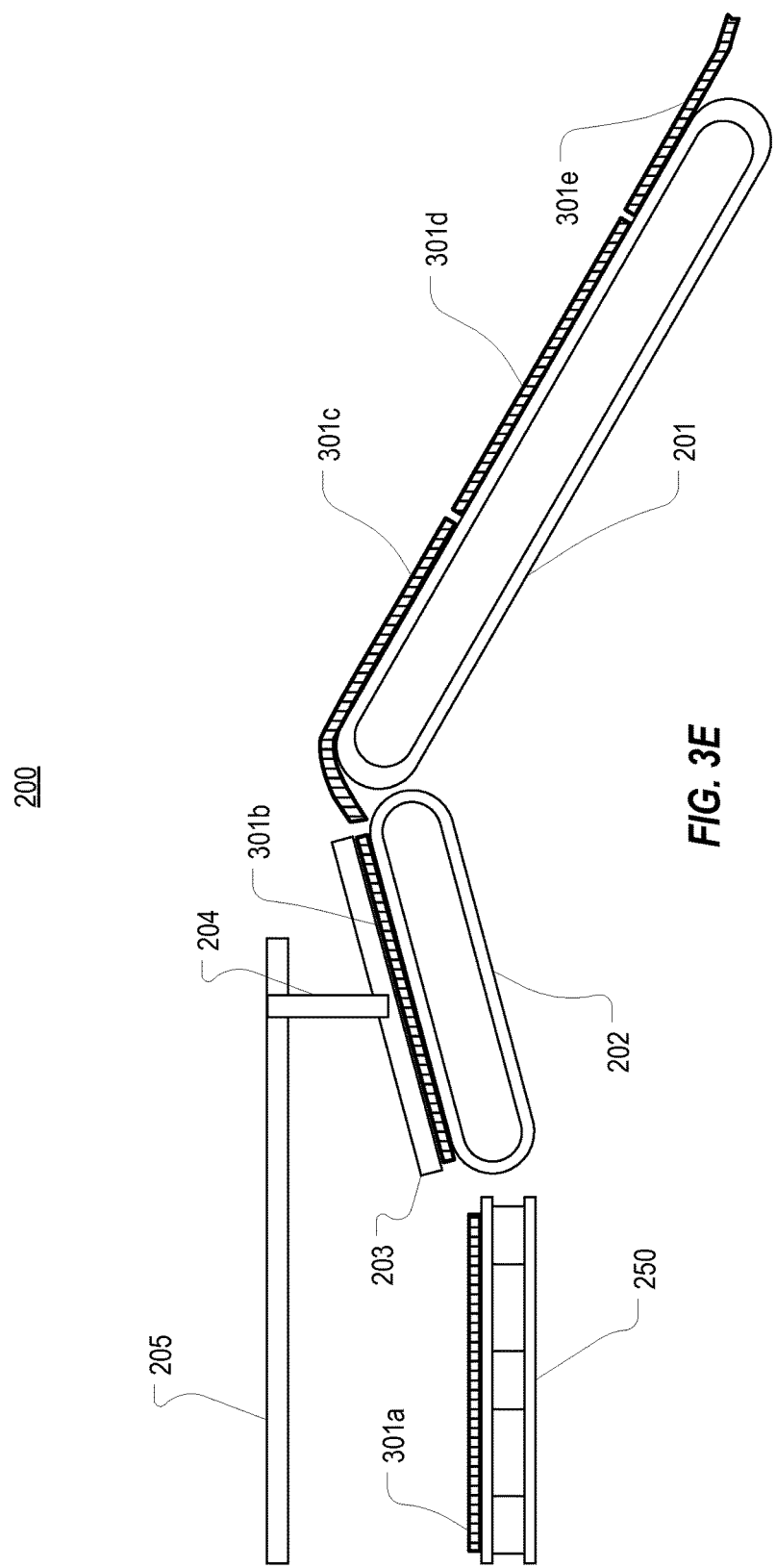

During this process of stacking slab 301a, inclined conveyor 201 and stacking conveyor 202 can continue to rotate thereby causing slab 301b to continue advancing towards the pick-up position as well as to continue advancing slabs 301c and 301d along inclined conveyor 201. After slab 301a is released onto pallet 250, FIG. 3E illustrates that stacking head 203 is quickly shuttled back to the pick-up position in time to secure and remove slab 301b. The above described stacking process is then repeated with slab 301b as shown in FIG. 3F.

The rate at which slabs are advanced to the pick-up position is directly dependent on the ground speed of sod harvester 200. Therefore, the ground speed is limited by how quickly stacking head 203 can complete a stacking operation. In other words, the amount of time that it takes to move stacking head 203 from the pick-up position to the stacking position and back to the pick-up position defines the maximum ground speed at which sod harvester 200 can be operated. By employing inclined stacking conveyor 202, stacking head 203 can perform a stacking operation quickly and with reduced energy due to the lack of vertical movement. The present invention therefore allows a sod harvester to operate at a faster ground speed thereby increasing harvesting yields.

To facilitate proper timing of the stacking operation, the movement of stacking head 203 can be based on the ground speed of the sod harvester. Accordingly, a sod harvester in accordance with embodiments of the present invention can include one or more sensors or other means for monitoring the ground speed of the sod harvester and a control unit for controlling the movement of stacking head 203 based on input from such sensors. Alternatively or additionally, one or more sensors for detecting the position of slabs on inclined conveyor 201 and/or stacking conveyor 202 could be employed to provide input to the control unit for controlling the operation of stacking head 203.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvester comprising:
a cutting head for cutting sod from the ground;
one or more inclined conveyors for receiving the sod from the cutting head and elevating the sod towards a stacking head;
a stacking conveyor configured to receive the sod from the one or more inclined conveyors, the stacking conveyor being oriented with an incline opposite the one or more inclined conveyors such that the sod descends along the stacking conveyor; and
the stacking head that is configured to remove the sod from the stacking conveyor, the stacking head having an inclined orientation that corresponds with the incline of the stacking conveyor, the stacking head being in the inclined orientation while removing the sod from the stacking conveyor, the stacking head further being configured to stack the sod on a pallet.

2. The sod harvester of claim 1, wherein the stacking head also has a horizontal orientation, the stacking head being configured to pivot from the inclined orientation to the horizontal orientation after removing the sod from the stacking conveyor and prior to stacking the sod on the pallet.

3. The sod harvester of claim 1, wherein the pallet is inline with the stacking conveyor.

4. The sod harvester of claim 1, wherein the stacking head shuttles along a single axis between a pick-up position overtop the stacking conveyor to a stacking position overtop the pallet, the single axis being parallel to a direction that the sod harvester travels while the cutting head cuts the sod from the ground.

5. The sod harvester of claim 1, wherein the pallet is not inline with the stacking conveyor.

6. The sod harvester of claim 1, wherein the stacking head shuttles along two axes between a pick-up position overtop the stacking conveyor to a stacking position overtop the pallet.

7. The sod harvester of claim 6, wherein the stacking head, after removing the sod from the stacking conveyor, initially shuttles along an axis that is parallel to a direction that the sod harvester travels while the cutting head cuts the sod from the ground and then shuttles along an axis that is not parallel to the direction.

8. The sod harvester of claim 1, wherein the cutting head is configured to deliver individual slabs of sod to the one or more inclined conveyors.

9. The sod harvester of claim 1, wherein the cutting head is configured to deliver a continuous length of sod to the one or more inclined conveyors, the sod harvester further comprising a blade positioned overtop the one or more inclined conveyors of the stacking conveyor, the blade cutting individual slabs of sod from the continuous length of sod prior to or when advancing the individual slabs onto the stacking conveyor.

10. The sod harvester of claim 1, further comprising:
one or more sensors for sensing a position of slabs of sod on the one or more inclined conveyors or the stacking conveyor; and
a control unit for receiving input from the one or more sensors and for controlling the movement of the stacking head based on the input.

11. The sod harvester of claim 10, wherein the control unit also receives second input representing a speed at which the sod is traveling on the one or more inclined conveyors of the stacking conveyor, the control unit controlling the movement of the stacking head based on the second input.

12. The sod harvester of claim 11, wherein the second input represents a ground speed of the sod harvester.

13. A sod harvester comprising:
a cutting head for cutting sod from the ground;
one or more inclined conveyors configured to receive the sod from the cutting head;
a stacking conveyor configured to receive the sod from the one or more inclined conveyors, the stacking conveyor being inclined in a downward direction; and
a stacking head configured to remove the sod from the stacking conveyor, the stacking head being oriented with an incline that corresponds with the incline of the stacking conveyor when removing the sod from the stacking conveyor.

14. The sod harvester of claim 13, wherein the stacking head is configured to shuttle to a stacking position overtop a pallet after removing the sod from the stacking conveyor.

15. The sod harvester of claim 14, wherein the stacking head is configured to pivot into a horizontal orientation while shuttling to the stacking position.

16. The sod harvester of claim 14, wherein the pallet is inline with the stacking conveyor.

17. The sod harvester of claim 14, wherein the sod harvester travels in a first direction while the cutting head cuts sod from the ground, and wherein the stacking head moves in the first direction prior to removing the sod from the stacking conveyor.

18. The sod harvester of claim 17, wherein the stacking head travels is a second direction opposite the first direction to remove the sod from the stacking conveyor.

19. The sod harvester of claim 18, wherein the stacking head also travels in a third direction when moving to the stacking position.

20. A sod harvester comprising:
a cutting head for cutting sod from the ground;
one or more first conveyors for receiving the sod from the cutting head, the one or more first conveyors being oriented with a first incline;
a stacking conveyor for receiving the sod from the one or more first conveyors, the stacking conveyor being oriented with a second incline, the second incline being opposite the first incline; and
a stacking head that shuttles between a pick-up position overtop the stacking conveyor and a stacking position overtop a pallet, the stacking head being inclined to correspond with the second incline while in the pick-up position.

* * * * *